(12) United States Patent
Mian

(10) Patent No.: US 10,295,293 B2
(45) Date of Patent: May 21, 2019

(54) WEAPON FOR TACTIC SIMULATION

(71) Applicant: LACS S.R.L., Mantova (IT)

(72) Inventor: Sergio Mian, Vicenza (IT)

( * ) Notice: Subject to any disclaimer, the term of this patent is extended or adjusted under 35 U.S.C. 154(b) by 0 days.

(21) Appl. No.: 15/115,976

(22) PCT Filed: Jul. 13, 2015

(86) PCT No.: PCT/IB2015/055279
§ 371 (c)(1),
(2) Date: Aug. 2, 2016

(87) PCT Pub. No.: WO2017/009687
PCT Pub. Date: Jan. 19, 2017

(65) Prior Publication Data
US 2018/0187995 A1 Jul. 5, 2018

(51) Int. Cl.
*F41A 33/02* (2006.01)
*F41G 3/26* (2006.01)
*G09B 9/00* (2006.01)

(52) U.S. Cl.
CPC ............ *F41A 33/02* (2013.01); *F41G 3/2655* (2013.01); *G09B 9/003* (2013.01)

(58) Field of Classification Search
CPC .......... F41G 3/26; F41G 3/265; F41G 3/2655; F41A 33/00; F41A 33/02; F41A 33/04; F41A 33/06; G09B 9/003
See application file for complete search history.

(56) References Cited

U.S. PATENT DOCUMENTS

| | | | |
|---|---|---|---|
| 3,898,747 A | 8/1975 | Marshall | |
| 5,837,965 A * | 11/1998 | Mosca | B23K 26/02 219/121.75 |
| 8,469,824 B1 | 6/2013 | Farley et al. | |
| 9,335,532 B2 * | 5/2016 | Kenny | G02B 21/06 |
| 9,791,243 B2 * | 10/2017 | Bjorkman | F41G 3/265 |
| 2006/0287113 A1 | 12/2006 | Small et al. | |
| 2007/0166667 A1 | 7/2007 | Jones et al. | |
| 2011/0300950 A1 | 12/2011 | Preston et al. | |
| 2012/0094256 A1 | 4/2012 | Preston et al. | |
| 2012/0231423 A1 | 9/2012 | Reardon et al. | |

FOREIGN PATENT DOCUMENTS

WO WO2008085906 A2 7/2008
WO WO2013076599 A1 5/2013

* cited by examiner

*Primary Examiner* — Timothy A Musselman
(74) *Attorney, Agent, or Firm* — Themis Law

(57) ABSTRACT

A weapon for tactical simulations provided with at least one projection device of electromagnetic beams to simulate the projectile fired by the weapon. The projection device includes a plurality of emitters of electromagnetic beams housed in projectors, each susceptible to emit electromagnetic beams having geometrical parameters different from those of the electromagnetic beams emitted by the other emitters so that each beam emitted realistically simulates a section of the path that the projectile to be simulated would cover. The weapon further includes an adjusting system of the electromagnetic beam emitted by the emitters to vary the geometric features so that the overall electromagnetic beam has, for all the path that the projectile to be simulated would cover, geometric features with values includes between predetermined intervals so as to realistically simulate the projectile.

8 Claims, 2 Drawing Sheets

WEAPON FOR TACTIC SIMULATION

FIELD OF THE INVENTION

The present invention is applicable to the field of military training, of tactical games and of simulation of military events and it particularly relates to weapons for tactical simulations or devices for transformation of conventional weapons or objects of recreational use in weapons for performing tactical simulations.

More in detail, the present invention relates to a projection device of electromagnetic beams for the simulation of weapons and belonging or applicable to a popgun or to a conventional weapon.

BACKGROUND OF THE INVENTION

In the field of sports activities and team games, in recent years those games or sport activities simulating military or police situations have especially developed. Lasertag relates to this field.

The latter is a team game based on military simulation. The activity simulates, using special equipment, battles with faithful reproductions of fire-arms. The lasertag may be performed both indoors and outdoors. Depending on the environment where it is performed and on the type of game system, the tactics of engagement and the aims to achieve change.

The equipment and weapons used are based on the use of projectors of directional electromagnetic beams (typically laser or infrared) and detectors of such beams. In particular, when a beam hits a player wearing special detectors, the latter is expelled. Typically, the weapons further comprise a control electronics and a system of communications therebetween and an operative centre that verifies the hit players, the types of shot, the type of weapon, the type of damage created, the game modality and other.

In this perspective, it is evident how the lasertag is further used in the military and security forces field to perform tactical simulations and for training. In this sense, the weapons used are simulative weapons or conventional weapons where the above mentioned projectors are applied thereto that are controlled by the trigger of the conventional weapon thereof, by a special additional trigger or by appropriate activating means such as, for example, detectors of vibrations and/or sounds and/or lights.

An important aspect of lasertag is to simulate as faithfully as possible the weapon used. In particular, the electromagnetic beam emitted must have a power suitable to the range that the projectiles of the simulated weapon would have. Furthermore, in the interval of distance that the projectiles of the simulated weapon may cover, the electromagnetic beam emitted must have a restrained opening. Finally, it may be necessary to fall within certain standard values to ensure the specific class of laser emission according to whether or not protective devices are used.

In fact, the emitted electromagnetic beams are characterized by the fact that they develop as a cone whose vertex corresponds to the emitter and whose base corresponds to the farthest point that the beam may reach with a suitable power. In order to properly simulate a firing weapon it is evident that at great distance the base of the cone must have a restrained diameter. For example, to simulate a precision weapon the base of the cone must have a diameter typically of 2 to 4 centimeters, while to simulate a normal weapon it is sufficient that such diameter does not exceed 40 centimeters. It is evident that a greater diameter would allow the weapon to simultaneously hit more targets placed side by side, hence losing its realism.

Then, the known projection devices are adjusted in such a manner that at preferred distances the emitted beam has a limited opening. However, the drawback is that beam thereof at close distance assumes infinitesimal sizes risking, for a close shot, that the target does not detect the received shot. In other words, a serious drawback of the known projection devices is that they may not be used simultaneously for close shots and for long-range shots unless losing the realism of the simulation, that is they fail to cover in a realistic manner the entire range of the weapon. Such drawback becomes as much more evident as more sophisticated is the weapon to be simulated and as more distant the simulated weapon may fire. In fact, it is known that some types of guns may fire with suitable precision even within some kilometers. In such case, a known emitter device adjusted to simulate such guns may not properly simulate the weapon for close shots, that is it does not allow to realistically cover the entire path of the projectile to be simulated starting from the outlet of the barrel of the weapon.

Documents US2011/311950 A1, US2007/166667A1, WO2008/085906A2 are also known and teach using more than one projector to simulate the trajectory of a projectile. They also teach performing some geometrical adjustment on the beam, but they do not teach performing a fine adjustment and a perfect adaptation of the beam to the weapon to be simulated.

SUMMARY OF THE INVENTION

Object of the present invention is to at least partially overcome the above mentioned drawbacks by providing a weapon for tactical simulations provided with a projection device of electromagnetic beams usable to properly simulate any weapon, in particular weapons that may fire shots or the like at long range.

In particular, an object of the present invention is to provide a projection device which allows to cover the entire range of the projectile to be simulated and not just a portion thereof as instead occurs in the prior art. In other words, an object of the present invention is to provide a projection device of electromagnetic beams, belonging or applicable to a weapon, whose electromagnetic beams have geometric features susceptible to realistically simulate a projectile for its entire range.

As part of the above mentioned general object, a particular object is to provide a projection device of electromagnetic beams that allows to simulate with beams of suitable opening both close and long-distance shots without the need to perform, in the passage from one situation to another, appropriate adjustments of the emitted beam.

Another object is that the device allows to properly simulate even precision weapons for which the cone identified by the emitted beam must have a diameter of few centimeters even at a long distance. A further object is that in such situation the emitted beam thereof is detectable even at close distance and that, therefore, it has a wider beam at the short distance.

These objects, as well as others which will appear more clearly hereinafter, are achieved by a weapon for tactical simulations according with one or more of the appended claims which are an integral part of the present patent.

In particular, such weapon comprises at least one projection device of electromagnetic beams.

According to an aspect of the invention, the projection device comprises two or more emitters of electromagnetic beams housed in one or more projectors. Moreover, each one of such emitters is susceptible to emit electromagnetic beams having different parameters from those of the electromagnetic beams emitted by the other emitters. In particular, to vary are at least the geometrical parameters.

Advantageously, therefore, each emitter emits electromagnetic beams with different opening and, therefore, susceptible to cover different firing distances and different surfaces. In this way, with the same weapon it is possible to properly simulate both close shots, where the beam must, nevertheless, have an opening angle large enough to ensure the detection on the target, and the long-range shots where the beam must have an especially limited opening to preserve the reliability of the simulation. This is made possible thanks to the presence of different emitters each one designated to emit beams having geometrical features such as to realistically simulate the projectile in a respective portion of the range of the latter.

According to another aspect of the invention, the weapon further comprises adjusting means of the electromagnetic beam emitted by at least one of the emitters to vary at least the geometric features so as the overall electromagnetic beam has, for the entire path that the projectile to be simulated would cover, geometric features with values comprised between predetermined intervals to realistically simulate the projectile.

Advantageously, therefore, each emitter may emit electromagnetic beams susceptible to realistically simulate the projectile for a section of its range. In this sense, the adjusting means allow to correct possible geometric inconsistencies of one or more emitted beams that may make the simulation lose its realism. The adjusting means thereof also easily allow to change the rules of engagement for instance by increasing or reducing the sizes of the overall beam as well as the maximum range. Still advantageously, the adjusting means allow to change the emitted beams in order to simulate different projectiles fired from different weapons.

According to a further aspect of the invention, the adjusting means comprise at least one first adjusting portion having the geometric shape of the electromagnetic beam emitted by at least one of the emitters, the first adjusting portion comprising at least an adjusting ring nut of the focal distance. Advantageously, each emitters having the adjusting ring nut can have the emitted beam fine adjusted to enable a perfect simulation of a real projectile of the weapon.

According to a further aspect of the invention, the weapon further comprises a control circuit that allows not only the activation of each one of the emitters, but also the above mentioned adjustments to advantageously automate them.

With regard to what has been said, it is evident that the above mentioned objects are further achieved by a projection device of electromagnetic beams applicable to a weapon to simulate the projectile fired thereby, characterized in that said projection device comprises two or more emitters of electromagnetic beams housed in one or more projectors and each one susceptible to emit electromagnetic beams having at least the geometrical parameters at least partially different from those of the electromagnetic beams emitted by the other of said emitters so as each emitted beam realistically simulates at least one section of the path that the projectile to be simulated would cover, said projection device further comprising adjusting means of the electromagnetic beam emitted by at least one of said emitters to vary at least the geometric features so as the overall electromagnetic beam has, for the entire path that the projectile to be simulated would cover, geometrical features with values comprised between predetermined intervals to realistically simulate the projectile, said projection device being characterized in that said adjusting means comprise at least one first adjusting portion of the geometric shape of the electromagnetic beam emitted by at least one of said emitters, said first adjusting portion comprising at least an adjusting ring nut of the focal distance.

BRIEF DESCRIPTION OF THE DRAWINGS

Further features and advantages of the invention will appear more evident upon reading the detailed description of a preferred but not exclusive embodiment of a weapon for tactical simulations according to the invention, shown as non limitative example with the help of the annexed drawings wherein:

FIGS. 2 to 4 represent details of the weapon of FIG. 1;

DETAILED DESCRIPTION OF SOME PREFERRED EMBODIMENTS

Figure 1:
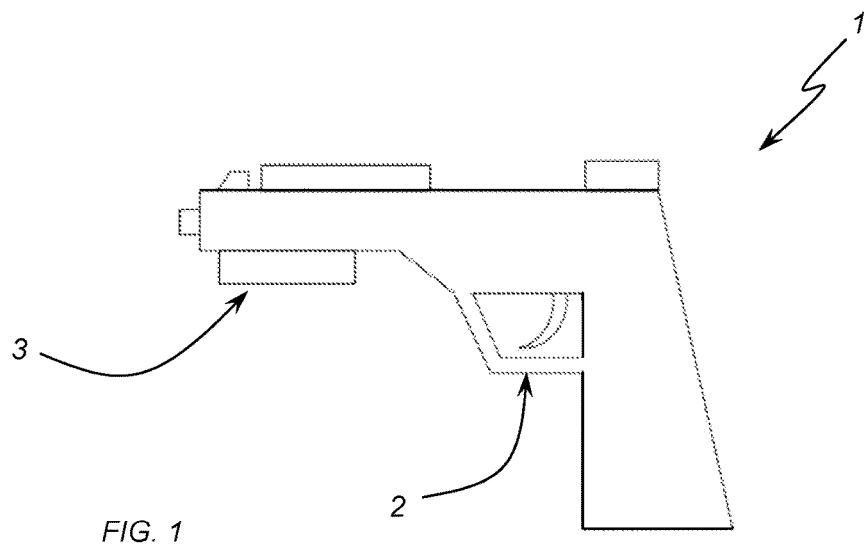
FIG. 1 represents a weapon for tactical simulations according to the invention in schematic view.

With reference to the above mentioned drawings, and in particular to FIG. 1, it is described a weapon 1 for tactical simulations. As in the drawing it is represented a gun, it is evident that this must not be considered in a limitative sense. In fact, the present patent further relates to other types of fire-arms for tactical simulations such as, for example, shotguns and submachine guns, rocket launchers, mortars and the like, being popguns or conventional ones.

As all fire-arms, also the weapon 1 of the invention comprises a trigger 2 with which to activate the shot. Such feature should not be considered as limitative for the invention.

Furthermore, the weapon 1, being used for the lasertag, comprises a projection device 3 of electromagnetic beams to simulate the projectile fired by the weapon 1. Such projection device 3 is operatively connected to activating means of the shot consisting of, in the embodiment that is described, said trigger 2. However, this should not be considered as limitative for different embodiments of the invention. In fact, the weapon described may be either a popgun or a conventional weapon or inert or with blanks. In case of a popgun, it may be both for the lasertag and for other types of game, as for instance the soft air or paintball. In any case, the projection device 3 is coupled thereto for use in the lasertag. In this sense, the trigger used may be the one already provided in the weapon, as in the above mentioned case, or, according to some operative embodiments and without departing from the scope of the present patent, it may be an additional trigger specially applied to activate the emissions of electromagnetic beams. As aforementioned, as for such popguns as, especially, for conventional weapons, a further embodiment of the activating means consists of a detector of vibrations, sounds and/or lights that detect the firing of the weapon for example loaded with blanks.

Figure 2:
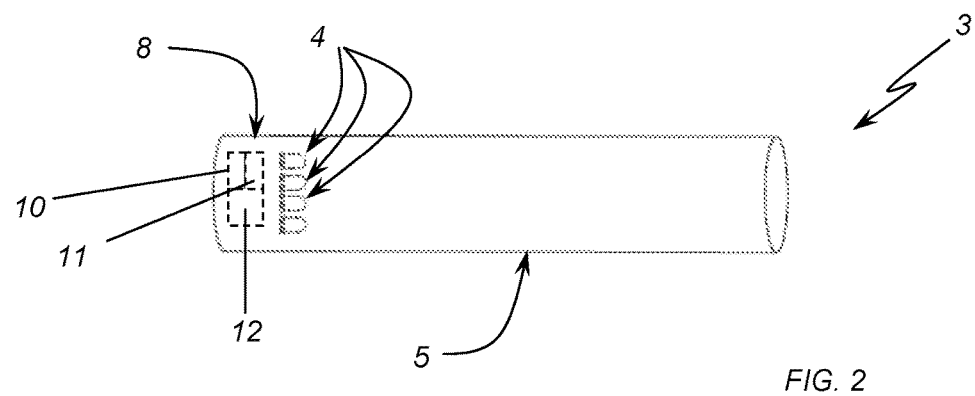

According to an aspect of the invention, the projection device 3 comprises, as it is observed in the detail of FIG. 2, a plurality of emitters 4 of electromagnetic beams housed in a projector 5. In particular, each emitter 4 is susceptible to emit electromagnetic beams having the geometrical parameters different from those of the electromagnetic beams emitted by the other emitters 4.

In other words, each emitter 4 is adjusted to emit an electromagnetic beam having the opening susceptible to realistically simulate the projectile for a predetermined section of its range. Therefore, in such section the emitted beam preserves geometrical and physical features such as to ensure a proper simulation of firing of a conventional weapon. The sum of more emitters 4 calibrated on different sections advantageously allows to faithfully simulate all weapons, even the long-range ones.

Figure 5:
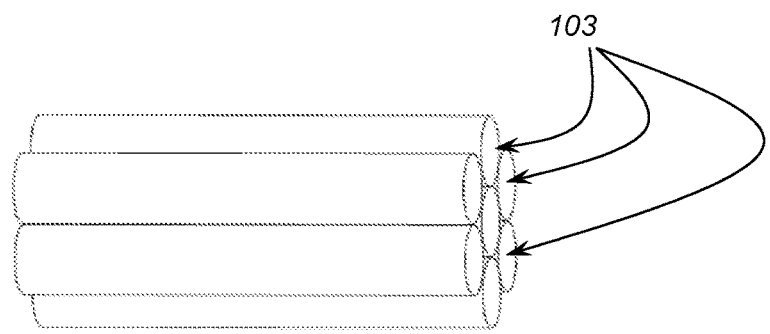
FIG. 5 represents an operative embodiment of the detail of FIG. 2.

Obviously, the number of projectors 5 and the number of emitters 4 for each projector 5 are not limitative features of the invention. In fact, since the essential aspect is to provide the weapon for tactical simulations 1 with a projection device 3 of electromagnetic beams that comprises two or more emitters 4, the same result is obtained, according to further operative embodiments, by assembling in the projection device more projectors each one provided with one or more emitters. An example in this sense is represented in FIG. 5 where more projectors 103 are assembled each one provided with a single emitter.

According to another aspect of the invention, the weapon 1 further comprises adjusting means of the electromagnetic beam emitted by the emitters 4 to vary the geometric features, as well as the directivity and the physical ones, at anytime. In this way, advantageously, not only the weapon 1 may be calibrated at anytime, but, as said, it is possible to vary the rules of engagement at anytime or change the type of weapon and/or of projectile to be simulated.

Obviously, the embodiment of such adjusting means varies with the number of projectors and with the number of emitters for each projector. Moreover, the number of emitters for which the adjusting means may vary the geometric, directivity and/or physical features of the emitted beam is variable. What is important is that at least one of the emitters is adjusted through such means to allow to calibrate the weapon maintaining the overall beam coherent with the simulated projectile. It is evident that the easier and more dynamic embodiment from a point of view of the modifications of the rules of engagement and of the calibration of the weapon provides that there are more projectors each one with a single emitter and that each projector has the above mentioned adjusting means. In this case, the performance of such means is simplified and the overall beam can be calibrated and modified in each section dedicated to each single emitter.

Obviously, as mentioned, the opening of the beam is only one of the adjustable parameters for each emitter 4. According to some operative embodiments, for instance, the direction of emission regarding the geometric parameters, or the power as example of a physical and not geometric parameter, are also adjustable.

In this sense, the adjusting means comprise at least one first adjusting portion of the geometric shape of the electromagnetic beam emitted by each one of the emitters 4. Typically, but not necessarily, there are also a second adjusting portion of the direction of the emitted electromagnetic beam and a third adjusting portion of the optical power of the electromagnetic beam emitted by each one of the emitters 4.

Figure 4:
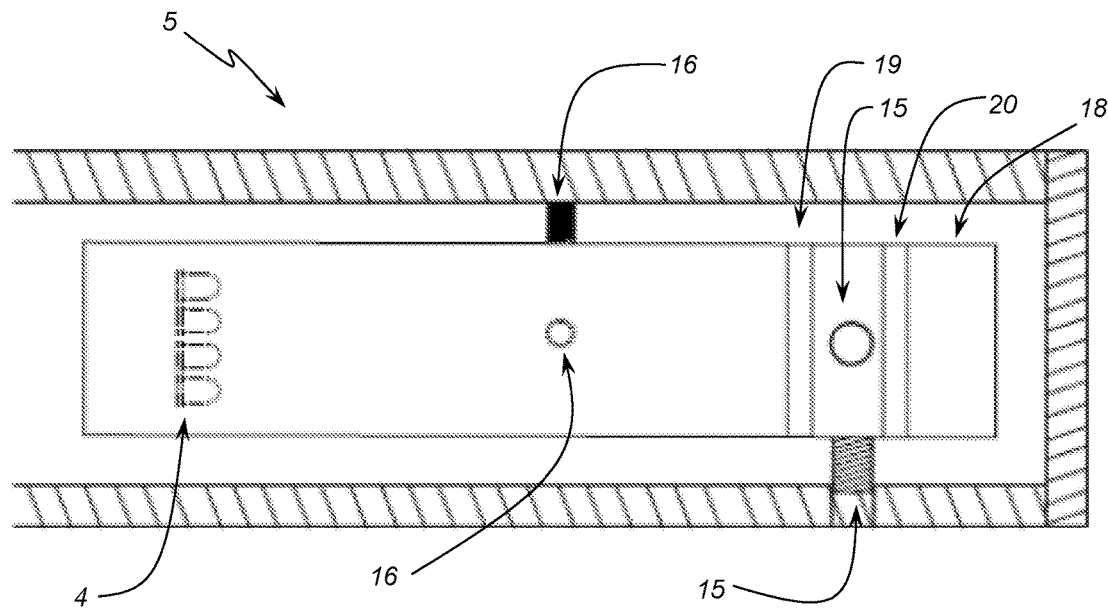
Figure 5:
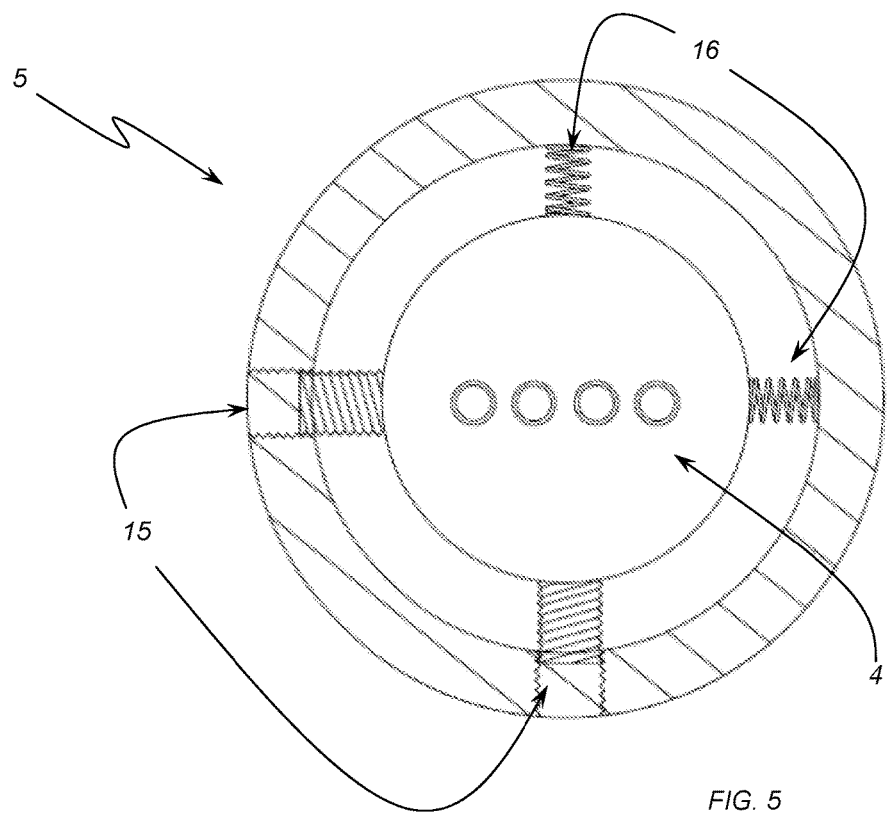

The adjustment of the direction of the beam emitted by the projector 3 occurs, as it can be observed in the details of FIGS. 3 and 4, by means of appropriate adjusting screws 15 and centering springs 16 designed to perform up-down and right-left adjustment of the direction. There are also, as above mentioned, an adjusting ring nut of the focal distance 18, a collimation lens 19 and an additional lens 20.

With regard to the emitters 4, their embodiment is not limitative for the invention. In fact, they may consist of one or more LEDs, one or more emitters of laser beams, other types of emitters or a mixture of emitters of different type.

According to another aspect of the invention, the projection device 3 further comprises a control circuit 8 susceptible to control the activation of each emitter 4. In this sense, the control circuit 8 is operatively connected to the trigger 2.

In other words, the control circuit 8 activates, following the pressing of the trigger 2, one or more emitters 4. Then, such control circuit 8 is typically programmable and it allows deciding a priori if the firing activity provides for the simultaneous and mixed emission of all the electromagnetic beams or of only a selection thereof.

Advantageously, therefore, the weapon 1 for tactical simulations of the invention allows to predetermine, time after time, the type of shot to be simulated, that is whether to simulate a long-range or a short-range weapon, or to simulate only long-distance or also close-distance shots, thereby varying the type of tactical simulation and the rules of engagement.

According to a further aspect of the invention, the control circuit 8 comprises more circuit portions. A first circuit portion 10 allows the control of the physical and geometrical parameters of the electromagnetic beam emitted by each emitter 4 as the power. Such adjustments, according to some operative embodiments not represented in the drawings, may also occur with the aid of special motors or with similar servo-assisted means designated, for example, to modify the reciprocal position of lenses and emitters.

Whereas, a second circuit portion 11 allows the control of the mixed or selective emission of the electromagnetic beams.

Moreover, a third circuit portion 12 allows to demodulate electrical control signals coming from the weapon 1 following the pressing of the trigger 2 to extract information with which to modulate the electrical control signals of the emitters 4 of the electromagnetic beams.

In fact, as it is known, the electromagnetic beams emitted by devices for the lasertag comprise a plurality of information such as, for example, the indication of the user who shoots, the type of simulated weapon, the type of projectile, and other. All such information is essential for the tactical simulation. Since it has been said that the weapon of the invention may be of any type, it is evident that it may be that it is, nevertheless, a weapon for the lasertag. In the latter case, the weapon may be subjected to the drawbacks of the prior art and to avoid invalidating the simulation it is necessary to provide the replacement of the original projection device with the one heretofore described and belonging to the weapon 1 of the invention. In such case, it is clear the need of interpreting the signals coming from the weapon in a proper manner and this is advantageously allowed by said third circuit portion 12. Specifically, in the particular case of tournaments or competitions this may allow to unify the communications in terms of procedure and efficacy of engagement.

To the end of the above said, according to some operative embodiments the weapon 1 of the invention further comprises, although not shown in the drawings, additional circuit portions to perform additional functionalities, such as a self-learning phase of the signals emitted by the weapon where the device of emission of electromagnetic signals is associated thereto.

With regards to what has been said, it is evident that object of the invention is also a projection device 3 of electromagnetic beams applicable to a weapon 1 to simulate the projectile fired thereby.

Such projection device 3 comprises a plurality of emitters of electromagnetic beams 4 housed in a projector 5 and each one susceptible to emit electromagnetic beams having the geometrical parameters different from those of the electromagnetic beams emitted by other emitters 4 so as each beam emitted realistically simulates at least one section of the path that the projectile to be simulated would cover.

The projection device 3 further comprising adjusting means of the electromagnetic beam emitted by each one of the emitters 3 to vary its geometric features so as the overall electromagnetic beam has, for the entire path that the projectile to be simulated would cover, geometric features with values comprised between predetermined intervals to realistically simulate the projectile thereto.

It is omitted herein a complete description of the projection device 3 of the invention since it would be repetitive of what has been already written about the weapon 1 for tactical simulations described above.

From an operative point of view, what is observed is that both in the case of the weapon 1 of the invention and in the case of application of a projection device 3, at the beginning of the tactical simulation the proper adjustment of all the weapon is provided so as the beams emitted are coherent with the weapon to be simulated and have, at various distances from the target, a proper opening. Such adjustment occurs by means of the control circuit 8, of the adjusting screws 15, of the adjustment ring nut 18, thereby determining the physical and geometrical parameters of each beam as well as determining how to activate the various emitters 4 of each weapon as a result of the pressing of the relative trigger 2. According to a possible operative embodiment, the geometric parameters of the beam such as the direction and the focal are also electrically adjusted by the control circuit.

In the light of the above mentioned, therefore, it is understood that the weapon for tactical simulations and the projection device of electromagnetic beams of the invention overcome the drawbacks of the prior art being usable to properly simulate any fire-arm, in particular weapons that may fire long-range shots.

In particular, the weapon for tactical simulations of the invention, as well as the projection device of electromagnetic beams, allow to simulate with beams of suitable opening both close shots and long-distance shots without the need of performing, in the passage from one situation to the other, appropriate adjustments of the emitted beam. Therefore, the simulation is perfectly realistic irrespective of the weapon to be simulated.

In particular, such simulation is proper also for precision weapons for which the cone identified by the emitted beam must have a diameter of few centimeters both at short distance and at long distance.

The weapon for tactical simulations and the projection device of electromagnetic beams of the invention are susceptible of numerous modifications and variations all falling within the inventive concept expressed in the appended claims. All the details may be replaced with other technically equivalent elements, and the materials may be different according to requirements, without departing from the scope of the invention.

Even if the weapon for tactical simulations and the projection device of electromagnetic beams of the invention have been described with particular reference to the annexed drawings, the numerals used in the description and in the claims are used to improve the intelligence of the invention and do not constitute any limitation of the claimed scope.

The invention claimed is:

1. A weapon for tactical simulations comprising:
   at least one projection device (3; 103) of electromagnetic beams to simulate a projectile fired by said weapon,
   wherein said projection device (3; 103) comprises two or more emitters of electromagnetic beams (4) housed in one or more projectors (5), each of the emitters emitting electromagnetic beams having geometrical parameters at least partially different from the geometrical parameters of the electromagnetic beams emitted by other emitters (4) so as to have each emitted beam realistically simulate at least one section of a path that the projectile to be simulated would cover; and
   an adjusting system of the electromagnetic beam emitted by at least one of said emitters (4) to vary at least geometric features of the electromagnetic beam so that the electromagnetic beam has, for the entire path that the projectile to be simulated would cover, geometric features with values comprised between predetermined intervals to realistically simulate the projectile,
   wherein said adjusting system comprises at least one first adjusting portion of a geometric shape of the electromagnetic beam emitted by the at least one of said emitters (4), said first adjusting portion comprising at least an adjusting ring nut of focal distance (18).

2. The weapon according to claim 1, wherein said adjusting system comprises at least one second adjusting portion of a direction of the electromagnetic beam emitted by the at least one of said emitters (4), said second adjusting portion comprising adjusting screws (15) and centering springs (16) performing up-down and right-left adjustment of said direction.

3. The weapon according to claim 1, wherein said adjusting system comprises at least one third adjusting portion of optical power of the electromagnetic beam emitted by the at least one of said emitters (4).

4. The weapon according to claim 1, further comprising also at least one control circuit (8) that controls at least activation of each one of said emitters (4).

5. The weapon according to claim 4, wherein said control circuit (8) comprises a first circuit portion (10) to control power of said electromagnetic beams.

6. The weapon according to claim 4, wherein said control circuit (8) comprises a second circuit portion (11) to control mixed or selective emission of said electromagnetic beams.

7. The weapon according to claim 4, wherein said control circuit (8) comprises a third circuit portion (12) that demodulates electrical control signals coming from said weapon (1) and generated by activation of an activating member and that extracts information with which to modulate electrical control signals of said electromagnetic beams.

8. A projection device (3; 103) of electromagnetic beams applicable to a weapon (1) to simulate a projectile fired therefrom, comprising:
   two or more emitters (4) of electromagnetic beams housed in one or more projectors (5), each of the emitters emitting electromagnetic beams having geometrical parameters at least partially different from the geometrical parameters of the electromagnetic beams emitted by other emitters (4) so as to have each emitted beam realistically simulate at least one section of a path that the projectile to be simulated would cover; and
   an adjusting system of the electromagnetic beam emitted by at least one of said emitters (4) to vary at least geometric features of the electromagnetic beam so that the electromagnetic beam has, for the entire path that the projectile to be simulated would cover, geometric features with values comprised between predetermined intervals to realistically simulate the projectile, wherein said adjusting system comprises at least one first adjusting portion of a geometric shape of the electromagnetic beam emitted by the at least one of said emitters (4), said first adjusting portion comprising at least an adjusting ring nut of focal distance (18).

\* \* \* \* \*